US011190646B2

(12) United States Patent
Freeman

(10) Patent No.: US 11,190,646 B2
(45) Date of Patent: *Nov. 30, 2021

(54) TRANSPARENT FAX CALL PROCESSING IN A MOBILE DEVICE

(71) Applicant: Advanced Messaging Technologies, Inc., Los Angeles, CA (US)

(72) Inventor: Kirk Allen Freeman, Goleta, CA (US)

(73) Assignee: ADVANCED MESSAGING TECHNOLOGIES, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,852

(22) Filed: May 31, 2019

(65) Prior Publication Data

US 2019/0356786 A1 Nov. 21, 2019

Related U.S. Application Data

(63) Continuation of application No. 15/784,030, filed on Oct. 13, 2017, now Pat. No. 10,334,119.

(51) Int. Cl.
*H04M 19/04* (2006.01)
*H04M 1/724* (2021.01)
(Continued)

(52) U.S. Cl.
CPC .......... *H04M 19/04* (2013.01); *H04M 1/724* (2021.01); *H04M 1/72403* (2021.01);
(Continued)

(58) Field of Classification Search
CPC .......... H04N 1/32708; H04N 1/32719; H04N 1/32406; H04N 1/00206; H04N 1/00307;
(Continued)

(56) References Cited

U.S. PATENT DOCUMENTS 5,200,991 A * 4/1993 Motoyanagi .......... H04M 1/725
358/442
5,388,150 A 2/1995 Schneyer et al.
(Continued)

FOREIGN PATENT DOCUMENTS

CN 1885955 A 12/2006
EP 1507400 A1 2/2005
(Continued)

OTHER PUBLICATIONS

First Examination Report, dated Oct. 23, 2019, for Indian Patent Application No. 201747032431.
(Continued)

*Primary Examiner* — Congvan Tran
(74) *Attorney, Agent, or Firm* — Womble Bond Dickinson (US) LLP

(57) ABSTRACT

Methods and apparatus are described for transparently processing a fax transmission by a fax software program in a mobile device. In one embodiment, the fax software program identifies an incoming call at the mobile device. Upon the identification, the program prevents a display screen of the mobile device from outputting an incoming call ringing alert. The program answers the incoming call and analyzes the call to detect whether the answered call is a voice call. Upon detecting that the answered incoming call is a voice call, the program outputs the incoming call ringing alert via the display screen. Otherwise, if the answered incoming call is a fax transmission, the program merges the call with a fax server, such that the fax server receives the fax transmission. Other embodiments are also described and claimed.

20 Claims, 8 Drawing Sheets

(51) Int. Cl.
*H04M 1/72403* (2021.01)
*H04N 1/00* (2006.01)
*H04N 1/32* (2006.01)
*H04W 4/16* (2009.01)

(52) U.S. Cl.
CPC ....... *H04N 1/00209* (2013.01); *H04N 1/3201* (2013.01); *H04N 1/32048* (2013.01); *H04W 4/16* (2013.01); *H04M 2201/52* (2013.01); *H04N 1/00472* (2013.01)

(58) Field of Classification Search
CPC .......... H04M 1/72522; H04M 2201/52; G06Q 30/0267
See application file for complete search history.

(56) References Cited

U.S. PATENT DOCUMENTS

| | | | | |
|---|---|---|---|---|
| 5,497,339 | A * | 3/1996 | Bernard | G06F 1/1626 703/25 |
| 6,442,404 | B1 | 8/2002 | Sakajiri | |
| 7,684,383 | B1 * | 3/2010 | Thompson | H04M 7/1295 370/352 |
| 7,990,950 | B2 * | 8/2011 | Zucker | H04N 1/00209 370/352 |
| 8,041,014 | B1 | 10/2011 | Daily et al. | |
| 2002/0041589 | A1 * | 4/2002 | Novak | H04M 1/72527 370/352 |
| 2002/0042264 | A1 * | 4/2002 | Kim | H04N 1/00307 455/414.1 |
| 2003/0167079 | A1 * | 9/2003 | Birnbaum | A61N 1/08 607/60 |
| 2004/0067780 | A1 * | 4/2004 | Eiden | B06B 1/164 455/567 |
| 2004/0264662 | A1 * | 12/2004 | Silver | H04M 1/57 379/142.06 |
| 2005/0037810 | A1 * | 2/2005 | Bryson | H04N 1/00106 455/557 |
| 2005/0096023 | A1 * | 5/2005 | Moore | H04W 4/16 455/415 |
| 2005/0153739 | A1 * | 7/2005 | Halsell | H04M 1/72527 455/557 |
| 2006/0154654 | A1 * | 7/2006 | Jabbour | H04M 3/428 455/417 |
| 2006/0188084 | A1 | 8/2006 | Rogers et al. | |
| 2008/0056466 | A1 * | 3/2008 | Nishimura | H04M 1/642 379/88.22 |
| 2008/0081569 | A1 * | 4/2008 | Shiono | |
| 2008/0112555 | A1 * | 5/2008 | Johns | |
| 2008/0248828 | A1 * | 10/2008 | Tomiyasu | G06F 3/1209 455/550.1 |
| 2009/0013210 | A1 * | 1/2009 | McIntosh | H04L 41/0672 714/4.1 |
| 2010/0128291 | A1 * | 5/2010 | Vendrow | G06F 21/64 358/1.9 |
| 2011/0007885 | A1 | 1/2011 | Kirchhoff et al. | |
| 2011/0053562 | A1 * | 3/2011 | Self | H04N 1/00307 455/412.1 |
| 2011/0312380 | A1 * | 12/2011 | Bard | H04N 1/00307 455/557 |
| 2013/0188228 | A1 * | 7/2013 | Poon | H04N 1/0022 358/442 |
| 2013/0242353 | A1 * | 9/2013 | Bard | H04N 1/00307 358/442 |
| 2014/0018049 | A1 * | 1/2014 | Cannon | H04W 4/16 455/414.1 |
| 2014/0082103 | A1 * | 3/2014 | Baxter, Jr. | |
| 2014/0113581 | A1 * | 4/2014 | Nassimi | H04M 3/42153 455/404.1 |
| 2014/0192968 | A1 * | 7/2014 | Stroud | H04M 11/06 379/93.02 |
| 2016/0277581 | A1 * | 9/2016 | Lam | H04M 1/72527 |
| 2017/0041496 | A1 * | 2/2017 | Lehavi | H04N 1/32708 |
| 2017/0201645 | A1 * | 7/2017 | Lehavi | H04N 1/32708 |

FOREIGN PATENT DOCUMENTS

| | | |
|---|---|---|
| JP | 2000-078304 A | 3/2000 |
| JP | 2004-140851 A | 5/2004 |
| JP | 2012-095070 A | 5/2012 |
| KR | 1020050098506 A | 10/2005 |

OTHER PUBLICATIONS

First office action of the Chinese Patent office dated Oct. 14, 2020 for Chinese Patent Application 201880066611.2.
Examination Report No. 1 of IP Australia dated Oct. 2, 2020 for Australian Patent Application 2018347492.
Notice of Reasons for Refusal of the Japanese Patent Office dated May 11, 2021 for related Japanese Patent Application No. 2020-540678.
Extended European Search Report of the European Patent Office dated Jun. 9, 2021 for related European Patent Application No. 18865598.9.
Examiner's Report of the Canadian Intellectual Property Office dated May 6, 2021 for related Canadian Patent Application No. 3,076,243.
Examination Report No. 2 of IP Australia dated Apr. 29, 2021 for related Australian Patent Application No. 2018347492.

* cited by examiner

TRANSPARENT FAX CALL PROCESSING IN A MOBILE DEVICE

This application is a continuation of pending U.S. patent application Ser. No. 15/784,030 filed Oct. 13, 2017.

FIELD

An embodiment of the invention is related to fax messaging, and more specifically to transparent processing of an incoming call to a mobile device, to detect a fax transmission contained therein that was sent to a telephone number of the mobile device. Other embodiments are also described.

BACKGROUND

Fax messaging continues to be an important avenue for the delivery of secure messages between individuals worldwide despite the proliferation of email message delivery services. Traditional fax messaging services require both a dedicated fax machine and a dedicated fax number to receive a fax transmission. Modern fax messaging services, such as those provided by j2 Cloud Services, Inc. of Hollywood, Calif., have eliminated the requirement for a dedicated fax machine, utilizing the Internet to provide greater flexibility for subscribers to transmit and receive fax messages via email. A subscriber of a modern fax messaging service is assigned a direct inward dialing (DID) telephone number, which the subscriber distributes to others who wish to send a fax message to the subscriber. The DID telephone number is in effect the subscriber's individual fax number. When an incoming fax transmission is received in a fax server at a particular DID telephone number, the fax messaging service generates a fax message from the fax transmission in a format that is suitable for transmission over a data network such as the Internet, and sends the fax message to the subscriber (e.g., to the subscriber's email address).

As mentioned above, fax messaging services typically assign a separate DID telephone number to each subscriber. The DID telephone number is a unique telephone number that is different from the subscriber's other phone numbers (e.g., mobile phone number, home phone number, work phone number.) An assigned separate DID telephone number has drawback. For instance, subscribers to the fax messaging services are forced to remember and inform others of this assigned separate DID telephone number, along with any other telephone number that may need to be distributed (e.g., a work/home telephone number). Having to remember multiple telephone numbers may be unwieldy, and lead to confusion. To solve this problem, a fax messaging service that has a fax server may provide software that runs in a mobile device, e.g., a mobile phone such as a cellular phone or a smartphone. The software enables the subscriber to receive a fax message that originated as a fax transmission that was addressed to the telephone number of the subscriber's mobile device, thus reducing or obviating the need for a separate DID telephone number. This capability also reduces the administrative burden on the provider of the fax messaging service since the provider does not need to assign and maintain a DID telephone number for each subscriber.

For example, the software may process a fax transmission as follows. When the subscriber answers an incoming call at the mobile device, the software "listens" to the answered call and detects (e.g., based on audible fax tones) whether the call includes a fax transmission. If so, the software will prompt the subscriber on the touchscreen of the mobile device as to whether or not the fax transmission should be accepted. If yes, then the software will place an outgoing call to a fax server (while the incoming fax call is on hold) and once the fax server answers it will conference (or merge) the incoming call with the outgoing call, so that the fax transmission can then continue with the fax server accepting the transmission. Once the transmission has been completed, the incoming call and the outgoing call are terminated. The fax server will then make the fax transmission that it has just received available in a format that can be downloaded over the Internet for viewing, either within an app running in the mobile phone of the subscriber or pushed to an email address of the subscriber.

SUMMARY

An embodiment of the invention is a method performed by a fax software program in a mobile device to automatically and transparently process an incoming call to the mobile device, to detect a fax transmission contained therein that was sent to a telephone number of the mobile device. To perform this task, the fax software program (which is stored in memory of the mobile device, and executed by a processor in the mobile device) includes a "transparent mode" that allows the software program to process an incoming call without immediate instruction or intervention by a user of the mobile device, and without alerting a user of the mobile device of the incoming call (e.g., preventing a graphical user interface (GUI) from displaying an incoming call alert on a display screen of the mobile device that informs the user of the incoming call). In other words, the fax software program operates transparently, such that the user is unaware that an incoming call having a fax transmission is received and being processed by the program.

Specifically, the fax software program identifies (at a low level that is not visible to the user) an incoming call being received at the mobile device, and answers the incoming call to receive the downlink communications or call content signal, without immediate user input (e.g., without the user of the mobile device giving an instruction to answer the call by, e.g., selecting a physical button or a GUI option displayed on a display screen of the mobile device or speaking a voice command, to direct the mobile device to pick up the incoming call). The fax software analyzes the received downlink communications signal to detect whether the signal indicates that the incoming call includes or is a fax transmission (in contrast to, for example, a voice call or voice transmission.) Upon detecting that the answered incoming call is a fax transmission, the program may place an outgoing call to a fax server, and will then conference (or merge) the incoming call with the outgoing call (to the fax server.) The fax server answers the outgoing call, through which the fax server may then receive the downlink communications signal, accept the fax transmission by communicating with the originating device of the fax transmission, and then decode the downlink communications signal in order to generate a fax message that may be in any suitable electronic image file format, e.g., Tagged Image File Format, TIFF. Once the fax transmission is complete for example as signaled by the originating device, the mobile device or the fax server may terminate the outgoing call. The fax server may transmit a notification to the mobile device that a fax message was just received. The mobile device may use the received notification to alert the user of the mobile device. The notification may be a push notification from the fax server to a mobile app that is running in the mobile device and that immediately generates a pop-up on the display screen of the mobile device and/or a sound effect that a fax message is available for viewing. Alternatively, the fax server may transmit its notification as an email message addressed to an email address of the user of the mobile device.

In another embodiment, the fax software program may determine whether to conference (or merge) the incoming call that includes a fax transmission with an outgoing call to the fax server, based on a telephone number associated with the incoming call or with the originating device, e.g., a caller ID of the incoming call. In other words, the program may screen incoming fax transmissions, in order to prevent certain faxes (e.g., solicitations) from being sent to the fax server. To accomplish this, the fax software program may include a fax list (or white list) that is stored in memory of the mobile device, of telephone numbers from which fax transmissions should be sent to the fax server. For instance, the program may compare a telephone number associated with the originating device to the telephone numbers stored in the fax list. If the telephone number associated with the originating device does not match any of the stored telephone numbers, the program may terminate (or disconnect) the call, since the fax transmission included in the call is not one in which the user of the mobile device wishes to receive. If, however, a matching telephone number is in the fax list, the fax software program may proceed to place an outgoing call to the fax server, in order to conference the incoming call with the outgoing call.

In one embodiment, in addition to or instead of the fax white list, a fax black list may be defined that contains telephone numbers from which fax transmissions should not be sent to a fax server. In that case, if the telephone number associated with the originating device matches with the stored, black list telephone numbers, the program may terminate (or disconnect) the incoming call. Note that this black list operation (or the white list operation) could take place before answering the call (and thus in some cases obviating answering of the call).

In another embodiment, upon a determination that the answered call is a voice call, rather than a fax transmission, the fax software program may prompt the user of the mobile device to pick up the call. Since prior to this determination the user has not been alerted of the call, and the program has already answered the incoming call, the program may output an incoming call ringing alert that mimics a normal incoming call ringing alert that is used to inform the user of an unanswered incoming call. For instance, the incoming call ringing alert may be presented through a GUI of the mobile device as an incoming call ringing screen that contains any information the user normally receives in a normal incoming call ringing alert (e.g., the caller-ID), and an option (e.g., a selectable touchscreen button) to pick up the call. In addition to prompting the user via the GUI, the fax software program may prompt by also triggering the playback of a ring tone and/or activate a vibration motor to cause the mobile device to vibrate. Thus, although the incoming call has already been answered, it is placed on hold while the user of the mobile device is prompted to pick up the voice call, giving the impression to the user that the incoming call has not yet been answered.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever aspects of the embodiments described here are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

References in the specification to "one embodiment" or "an embodiment" means that a particular feature, structure, or characteristic described in conjunction with the embodiment can be included in at least one embodiment, but every embodiment may not necessarily include the particular feature, structure, or characteristic. Moreover, such phrases are not necessarily referring to the same embodiment.

Figure 1:
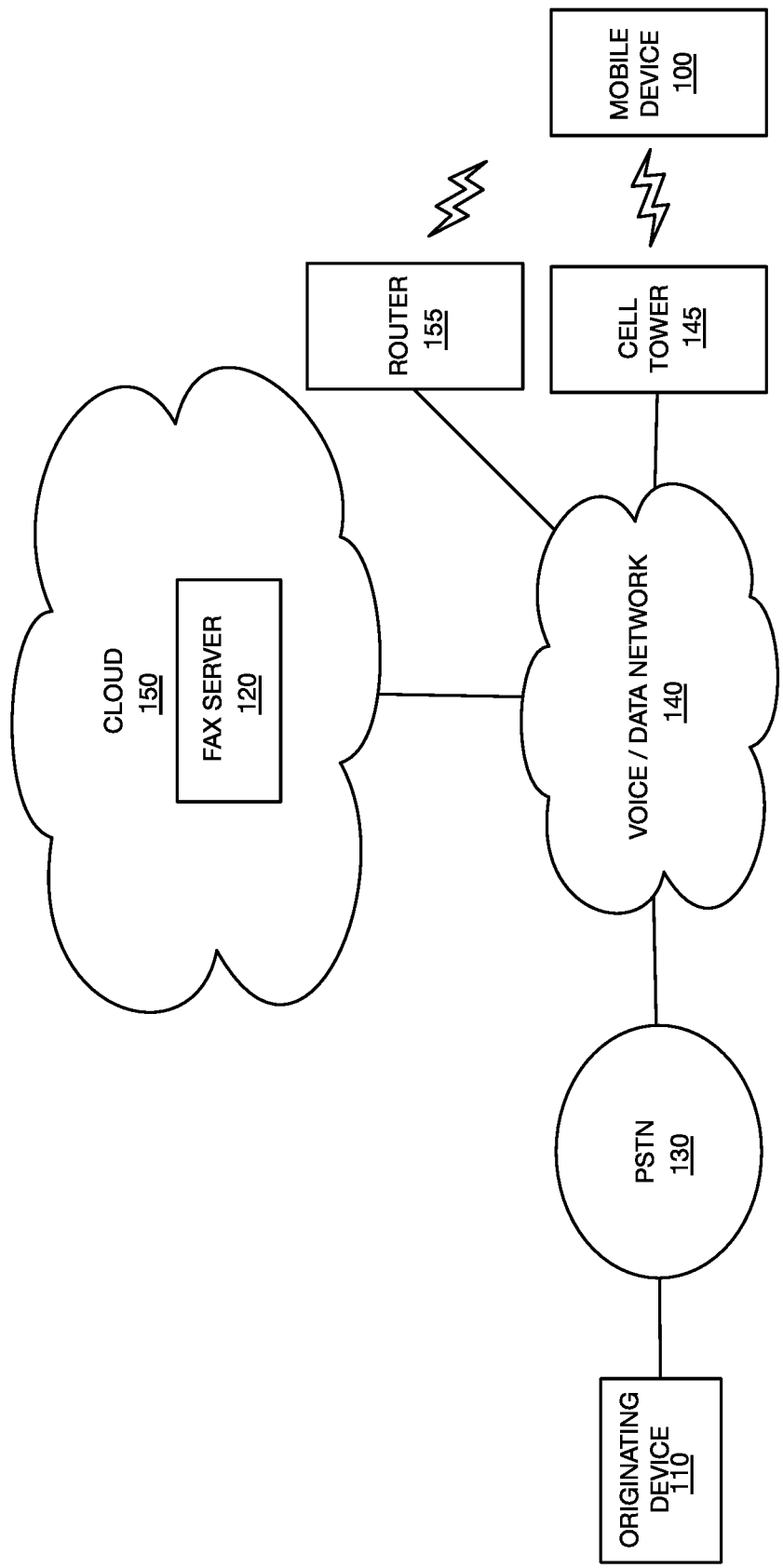
FIG. 1 is a block diagram illustrating a fax messaging system, according to some embodiments.

FIG. 1 is a block diagram illustrating a fax messaging system, according to some embodiments. The fax messaging system includes a public switched telephone network (PSTN) 130 coupled to a voice/data network 140. As shown, an originating device 110 of a sending party is coupled to the PSTN 130 and a mobile device 100 of a receiving party is coupled to the voice/data network 140 via a cell tower 145 and/or a wireless router 155. The voice/data network 140 and the cell tower 145 can be part of a communications network that supports voice calls for mobile devices (e.g., a 4G Long Term Evolution (LTE) network). On the other hand, the voice/data network 140 and the (e.g., wireless) router 155 can be part of other communications networks that supports voice-over-IP (and fax-over-IP) between the device 110 and the mobile device 100 (e.g., local area networks and wireless area networks). A fax server 120 located in a cloud computing system 150 is coupled to the voice/data network 140. In one embodiment, rather than the originating device 110 being coupled to the PSTN 130, it may instead be coupled to the voice/data network 140 through other means, such as a cell tower and/or wireless router.

The originating device 110 may be a stand-alone dedicated fax transmission and reception device (e.g., a fax machine), or it may be integrated as part of a computer or server having a fax modem. Thus, the device 110 can send a fax transmission through the PSTN 130 using a suitable fax protocol such as the Group 3 protocol defined by the International Telecommunications Union Telecommunication Standardization Sector (ITU-T) (e.g., as defined in ITU-T Recommendations T.30 and T.4). The sending party may operate the device 110 to thus send a fax transmission to a recipient, by for example placing a paper document into the device 110 and entering the phone number of the recipient into the device 110. The phone number may a mobile phone number that has been assigned to a particular mobile device that is associated with (e.g., owned by) the recipient. The device 110 scans the paper document and converts the contents of the document into an electronic fax format. Alternatively, the device 110 may convert an electronic document into the electronic fax format. The device 110 then transmits the contents of the document to a destination that is identified by the phone number of the recipient, through the PSTN 130 and/or other communications networks (e.g., using voice-over-IP or fax-over-IP over a data network) in the form of audio-frequency tones (e.g., a fax tone as per the Group 3 protocol).

In contrast with (or in combination with) having faxing capabilities (e.g., transmission and reception), the originating device may have telephony capabilities, such as receiving and transmitting voice calls through the PSTN 130 and/or other communication networks that supports voice-over-IP (e.g., the originating device being any one of a landline telephone, a mobile phone, a smart phone, a tablet, a laptop, or alike). The originating device 110 can make a call through the PSTN 130 by dialing a telephone number (e.g., (222) 222-2222) of the receiving party. The PSTN 130 may then route the call to a mobile switching center (e.g., which may be a part of the voice/data network 140) that connects the call with the mobile device 100, via the cell tower 145.

The mobile device 100 can be any mobile device that is capable of receiving phone calls originating from the PSTN 130, voice/data network 140, or similar communications networks, e.g., a mobile phone, a smartphone, a tablet, or a laptop. For example, the mobile device 100 may receive an incoming call originated by the device 110 through the PSTN 130, voice/data network 140, other communications networks, or any combination thereof (e.g., if the sending party sends a fax transmission to the telephone number of the mobile device 100). However, mobile devices in general are not configured to process or handle incoming fax transmissions (as an incoming phone call). For example, if the receiving party (e.g., user) picks up an incoming call from the device 110 using the mobile device 100, the receiving party will hear a fax tone that is incomprehensible to a human, and there is no way for the receiving party to receive the message content from the fax transmission or otherwise decode or decipher the contents of the fax transmission. In one embodiment, as will be described further herein below, the mobile device 100 can automatically and transparently place an outgoing call to the fax server 120 and conference (or merge) the incoming call with the outgoing call such that the fax server 120 can receive the incoming call and decode the fax transmission contained therein.

The fax server 120 may be operated by a cloud-based fax messaging service and is capable of processing fax transmissions destined for subscribers of the fax messaging service. (A user of the mobile device 100 may also be a subscriber of the fax messaging service.) The fax server 120 can receive a fax transmission intended for a subscriber, generate a fax message from (or decode message content in) the fax transmission, wherein the fax message is in a format that is viewable by the subscriber, e.g. Portable Document Format (PDF), Tagged Image File Format (TIFF), and make the fax message available to the subscriber. In one embodiment, the fax server 120 stores or otherwise has access to a database that stores account information for subscribers of the fax messaging service. The account information for a subscriber (e.g., a user) may include the mobile telephone number of the subscriber (that is assigned to the mobile device 100), the e-mail address of the subscriber, and other information related to the subscriber's account. As shown, the fax server 120 is part of a cloud computing system 150. In other embodiments, a stand-alone server computer or a cluster of server computers may implement the fax server 120.

The fax server 120 can make the fax message available to the receiving party through various means. In one embodiment, the fax server 120 sends the fax message to an e-mail address of the receiving party—a so-called "push" mechanism. In another embodiment, the fax server 120 stores the fax message in a data storage until the receiving party accesses it there over a network—a so-called "pull" mechanism. For example, the fax message may remain stored on a web server accessible over the Internet. In another embodiment, a notification is sent to (addressed to) the receiving party that indicates that a new fax message is available, along with information on how to access the new fax message (e.g., an email notification containing a hyperlink, such as a uniform resource locator (URL), to the stored fax message). In one embodiment, the notification is sent as a text message to the known telephone number of the mobile device 100. The receiving party may specify to the provider of the fax messaging service when and how the receiving party wishes to receive fax messages and/or notifications. For example, the receiving party may specify to the provider that any new fax messages for the receiving party should be sent as an attachment in an e-mail to the e-mail address of the receiving party. Suitable web servers or mail servers may be provided as part of the fax messaging system to implement such functionality.

In order to obviate the need for a separate DID telephone number at a fax server, as previously described, a fax messaging service may provide mobile fax software that runs (executes) in a mobile device, e.g., as part of a mobile app. The mobile fax software enables a subscriber to receive a fax message that originated as a fax transmission that was addressed to a telephone number of the subscriber's mobile device. To do this, the mobile fax software may process a fax transmission as follows. When the subscriber answers an incoming call at the mobile device, the mobile fax software "listens" to the answered call and detects (e.g., based on recognizing audible fax tones) whether the call includes a fax transmission. If so, the software will prompt the subscriber on the touchscreen of the mobile device as to whether or not the fax transmission should be accepted. If the subscriber wishes to accept the fax transmission, by the subscriber responding to the prompt indicating as such (e.g., by the subscriber pressing an "ok" button on the prompt), then the software will place an outgoing call to a fax server (while the incoming fax call is on hold.) Once the fax server answers, the mobile fax software will conference (or merge) the incoming call with the outgoing call, so that the fax transmission can then continue with the fax server signaling to the fax originating device for accepting the transmission. Once the transmission has been completed, the incoming call and the outgoing call are terminated. The fax server will then make the fax transmission that it has just received available in a format that can be downloaded over the Internet for viewing, either within an app running in the mobile phone of the subscriber or pushed to an email address of the subscriber. Note however that in that scenario, the mobile fax software requires the subscriber to actively participate in order to initiate reception of the fax transmission by the fax server. For example, as previously described, when an incoming call is received at the mobile device, the subscriber is required to 1) instruct telephony software in the mobile device to answer the incoming call, and 2) respond to a further prompt when the subscriber wishes to accept the fax transmission.

Embodiments of the invention overcome the disadvantages associated with a mobile device user actively participating in an incoming call addressed to a mobile phone number of the device that may be a fax transmission, by a processor in the mobile device executing a fax software program to automatically and transparently process the incoming call to detect a fax transmission contained therein. In other words, the fax software program now automatically performs operations that were previously required to have user input (e.g., answering the incoming call and placing an outgoing call to the fax server.) In addition, in one embodiment, the fax software program does so without alerting the user of the mobile device. Specifically, the fax software program automatically, and without immediate user input, answers incoming calls and decides whether or not to conference (or merge) the incoming call having the fax transmission with an outgoing call to the fax server. If the incoming call is detected to be a fax transmission, then the outgoing call is made, and the fax transmission is routed or sent to the fax server through the outgoing call (by merging the answered incoming call). If, however, the incoming call is detected to be a "voice" call rather than a fax transmission, the fax software program may not place the outgoing call and will prompt a user of the mobile device 100 (e.g., through playback of a ring tone and/or presentation of a phone ringing GUI) to pick up the voice call. The user may be instruct the software to answer the call, e.g., by actuating a physical button on the mobile device 100 or actuating a virtual button in the GUI displayed on a touchscreen display of the mobile device 100.

Figure 3:
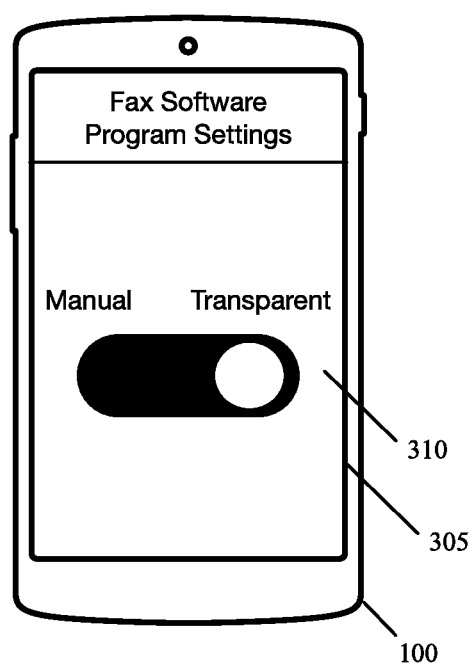
FIG. 3 shows an example GUI configuration screen that shows a fax software program's settings.

To operate transparently, the mobile device may include a transparent mode of operation for the fax software program that allows the software program to process incoming calls at the mobile device, without user intervention and without alerting the user of the mobile device 100 of the incoming call. FIG. 3 shows an example graphical user interface (GUI) configuration screen 305 that shows the fax software program's configuration settings, displayed on a display screen of the mobile device 100. The GUI screen 305 includes a control option 310 for switching the fax software program between a "manual mode" and the transparent mode. In transparent mode, the program processes incoming calls while the mobile device 100 remains for example in a "standby" (or sleep) mode, without a normal incoming call ringing alert being output on the display screen or through a speaker (e.g., a loudspeaker or a connected headset.) Thus, for example, while in transparent mode, the fax software program will answer every incoming call, without immediate user input being required (e.g., without user selection of a GUI item instructing the mobile device to answer the call), and while the display screen remains in the standby mode (or sleep.) This may also be described as "preventing" the GUI from displaying the typical incoming call ringing screen, which may also have a GUI item for selection by the user to instruct the mobile device to answer the call.

In one embodiment, if the user is using the mobile device (e.g., running another application, such as a game), transparent mode ensures that the user is not interrupted, while the fax transmission is being processed. In this way, the fax software program may send a fax transmission to the fax server 120, without the user of the mobile device 100 being made aware of the fax transmission.

If the fax software program determines that the incoming call is a voice call, rather than a fax transmission, the fax software program may output an incoming call ringing alert (e.g., by presenting an incoming call ringing screen on the display screen of the mobile device or playing back a ring tone) to prompt the user to pick up the incoming call. For example, the fax software program may activate a display screen of the mobile device to display a GUI of an incoming call ringing screen; and the fax software program may trigger playback of a ring tone through a speaker of the mobile device. Once the user picks up the call, the mobile device may then "connect" the already-answered call, e.g., by allowing transmission of an uplink communications audio signal captured by a microphone of the mobile device through the answered incoming call, and simultaneously playing back the downlink communication audio signal received from the originating device (through the incoming call.)

Unlike transparent mode, in which the fax software program operates automatically and transparently, manual mode is more similar to the previously described fax messaging services, which requires user input during the processing of incoming calls. For instance, while in the manual mode, when the mobile device receives an incoming call the device may immediately output a normal incoming call ringing alert to prompt the user to answer the call. Once the user instructs the software to answer the call, and then a fax transmission is detected in the answered call, the software may then prompt the user to decide whether to send the fax transmission to the fax server.

In one embodiment, the fax software program is integrated as part of an operating system of the mobile device 100. In another embodiment, the fax software program is an application (e.g., a mobile app) that runs on top of an operating system of the mobile device 100. In another embodiment, the fax software program may have some components that are considered to be part of the operating system, and other components that are part of a mobile app. The fax software program can be executed as a background process of the mobile device 100 and can be activated (e.g., brought to the foreground) as needed, e.g. when the user wishes to manually change its configuration settings.

In one embodiment, the fax software program is launched but then remains in the background, and is activated (e.g., brought to the foreground) when the mobile device 100 receives an incoming call. Specifically, the fax software program may become active when it identifies an incoming call being received at the mobile device 100. In another embodiment, the fax software program may remain in the background, and once an incoming call is received, the mobile device (e.g., another software component that is executing in the mobile device) may then activate the program, in order for it to process a potential fax transmission that may be included in the incoming call.

Figure 2:
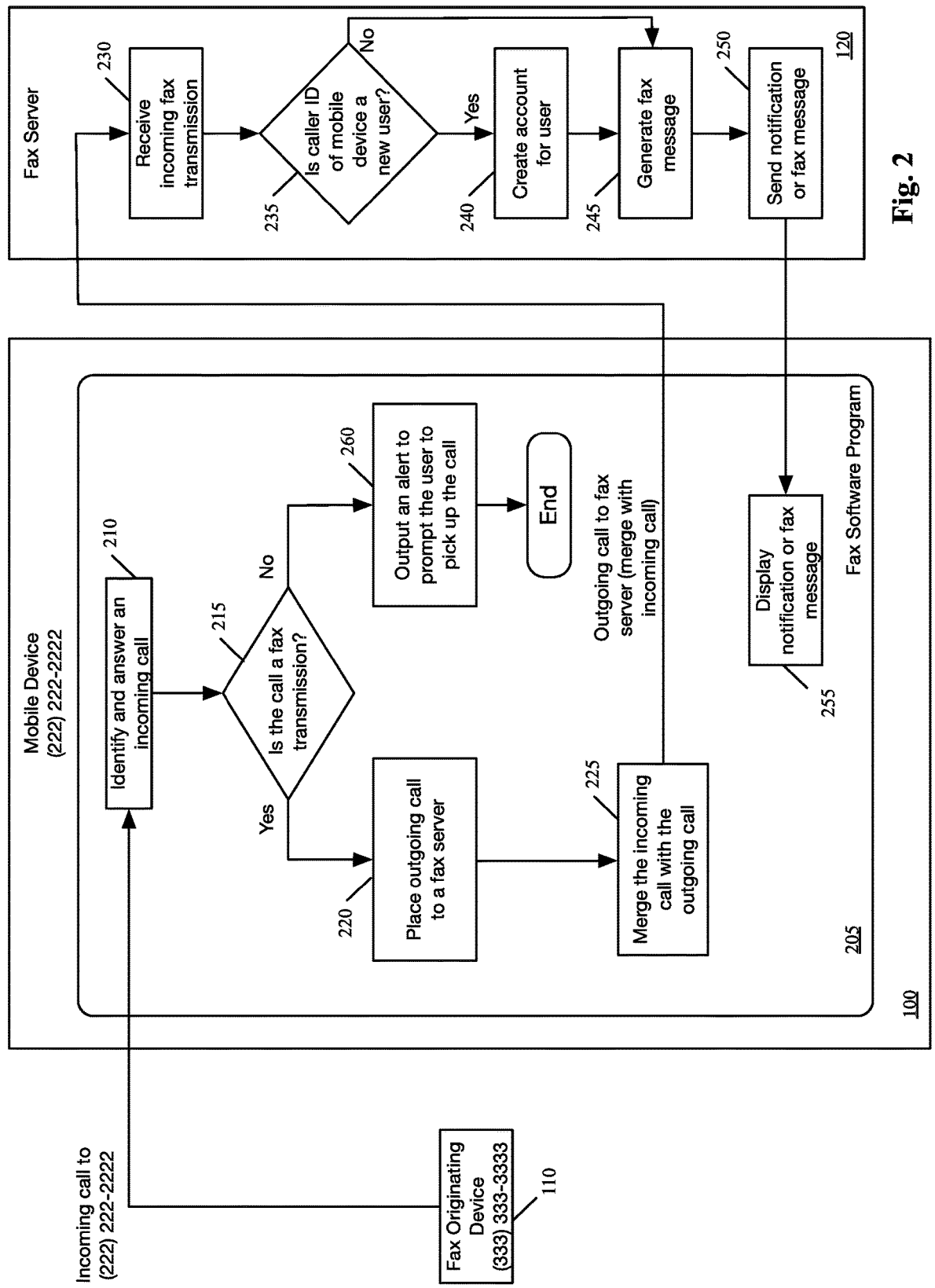
FIG. 2 is a flow diagram illustrating operations performed by a fax originating device, a mobile device, and a fax server including those by a fax software program running in the mobile device.

FIG. 2 is a flow diagram illustrating operations performed by an originating device, a mobile device, and a fax server including those by a fax software program executing in the mobile device to automatically and transparently process an incoming call in order to detect whether a fax transmission is being received at the mobile device, according to some embodiments.

The mobile device 100, as previously described includes a fax software program 205 for automatically and transparently processing of an incoming call to the mobile device 100, in order to detect a fax transmission contained therein that was, sent to a telephone number of the mobile device 100. The fax software program 205, in this example, is operating in the transparent mode, which allows the program 205 to process incoming calls without immediate user instruction or intervention and without alerting the user of the incoming calls, as previously described. The originating device 110 places a call to a telephone number of the mobile device 100 (i.e., telephone number (222) 222-2222) and the mobile device 100 receives the incoming call. At this point, the fax software program 205, which prior to the mobile device 100 receiving the incoming call may have been operating in the background, is activated (e.g., brought to the foreground), in response to the program 205 identifying the incoming call (at block 210). Along with identifying the incoming call, the program 205 may also identify information related to the incoming call, such as the telephone number (e.g., (333) 333-333) of the originating device 110, through caller ID). The program 205 answers the incoming call, and determines (e.g., analyzes) whether the incoming call is or contains a fax transmission (at decision block 215). This determination may be based on whether the fax software program 205 recognizes a signal associated with fax tones, or parses metadata indicating that the call includes a fax transmission.

If the answered incoming call is determined to be a fax transmission, the program 205 places an outgoing call to the fax server 120 (at block 220). The fax software program then proceeds to conference (or merge) the incoming call with the outgoing call (at block 225), where it may do so once the fax server 120 has answered the outgoing call from the mobile device 100, so that the fax server 120 can now receive the fax transmission. In other words, the fax server 120 receives the incoming fax transmission from the originating device, through a conference call with the mobile device 100 (at block 230). For instance, once the fax server 120 answers the outgoing call from the mobile device 100, the fax software program can then immediately conference, or merge, the incoming call with the outgoing call to the fax server 120 such that the fax server 120 also receives the incoming fax transmission. For example, in one embodiment, the fax software program establishes a three-way call between the originating device 110, and the mobile device 100, and the fax server 120 so that the fax server 120 can receive the fax transmission originated by the device 110.

Staying with the fax server 120, the fax server 120 may determine whether or not the incoming call it has received is for a new user, e.g., not an existing subscriber (at decision block 235). In one embodiment, the fax server 120 determines whether the user of the mobile device 100 is a new user by determining whether the telephone number of the mobile device 100 that conferenced the fax server 120 is associated with an existing subscriber (e.g., by matching the known telephone number of the mobile device 100 against subscriber account information stored in a database). In one embodiment, the fax server 120 can identify the telephone number of the mobile device 100 that conferenced the fax server 120 using caller-ID techniques. If the user is determined to be a new user, then the fax server 120 may create a user account for the user (at block 240). Creating a new user account for the user may involve the fax messaging service requesting information from the user (e.g., through the fax software program, through a website, or other means). In one embodiment, the fax server 120 or other server operated by the fax messaging service can automatically obtain information about the user from the fax software program, without actively soliciting the user, since the fax software program is transparently processing the incoming call, thereby making the user of the mobile device 100 unaware of the operations taking place. For example, the fax software program may have knowledge of the user's e-mail address and may send this information (e.g., over a data network such as the Internet) to the fax server 120 or other server operated by the fax messaging service in response to a query from the server. The fax server 120 may then associate this e-mail address with the user, when creating a user account for the user, e.g. stores the e-mail address in association with the caller-ID received with the incoming call from the user's mobile phone 100. The fax server 120 may thereafter use this e-mail address to send a fax message (that it receives through an incoming call from the user's mobile device) to the user.

If the fax server 120 determines that the user is not a new user (i.e., the user is an existing subscriber to the fax messaging service or has previously created an account with the fax messaging service), then the fax server 120 immediately generates a fax message from the received fax transmission (at block 245). Note also that the fax server 120 may be shared in that it can process incoming calls from a number of different mobile devices 100 associated with different users or subscribers.

In one embodiment, the fax server 120 performs in error correction mode (ECM) to detect and correct errors that may have occurred in the fax transmission (e.g., caused by noise).

In one embodiment, the fax server 120 generates the fax message in a digital format that is viewable on the mobile device 100 or other type of computing device. For example, the fax server 120 may format the fax message in a portable document format (PDF) format. The fax server 120 then sends a notification to the mobile device 100 indicating that the fax message is ready to be viewed and/or directly sends the fax message to the mobile device 100 of the user (at block 250). The mobile device 100 receives the notification and/or the fax message and displays it on the display of the mobile device 100 (at block 255), e.g., as a push notification. The fax server 120 can make the fax message available to the user of the mobile device 100 (i.e., the receiving party) through various means (e.g., through e-mail or by storing the fax message on a web server accessible by the user). In one embodiment, the fax messaging service may request payment from the user of the mobile device 100 (e.g., through the fax software program) or otherwise process a payment for the user (e.g., by deducting payment credit from the user's account) before making the fax message available to the user. Thus, these operations allow a user to receive a fax message sent directly as a fax transmission to a telephone number of the mobile device 100.

Returning to fax software program running in the mobile device 100 and in particular the decision block 215, if the call is determined to be a voice call, rather than including a fax transmission, the fax software program outputs an incoming call ringing alert to prompt the user to pick up the answered incoming call (at block 260). As previously described, since up to this point the user has not been made aware of the answered call, or its processing, the fax software program may output the alert to the user, which may mimic a ringing alert that is normally used to inform the user of an unanswered incoming call. For example, the alert may be presented through a GUI of the mobile device as a normal incoming call ringing screen that contains any information the user normally receives in a ringing alert (e.g., the caller-ID), and an option to pick up the call. In one embodiment, along (or a part) from displaying the GUI, the fax software program may prompt by also triggering playback of a ring tone through a speaker of the mobile device. The ringing may continue until the user picks up the call, or for a predetermined amount of time (e.g., 30 seconds), at which point if the user has not picked up the call the fax software program conferences the answered call with a cloud-based voicemail service to record (or produce) a voice message.

Some embodiments perform variations of the operations described in FIG. 2. For example, the specific operations of this figure may not be performed in the exact order shown and described. The specific operations may not be performed in one continuous series of operations, some operations may be omitted, and different specific operations may be performed in different embodiments. For example, the operations performed by the fax server 120 may be in a different order than that shown in this figure. For instance, the fax server may first determine whether or not the incoming call it has identified is for a new user (at decision block 235), before it actually answers the call and then receives the incoming fax transmission (at block 230.)

Figure 4:
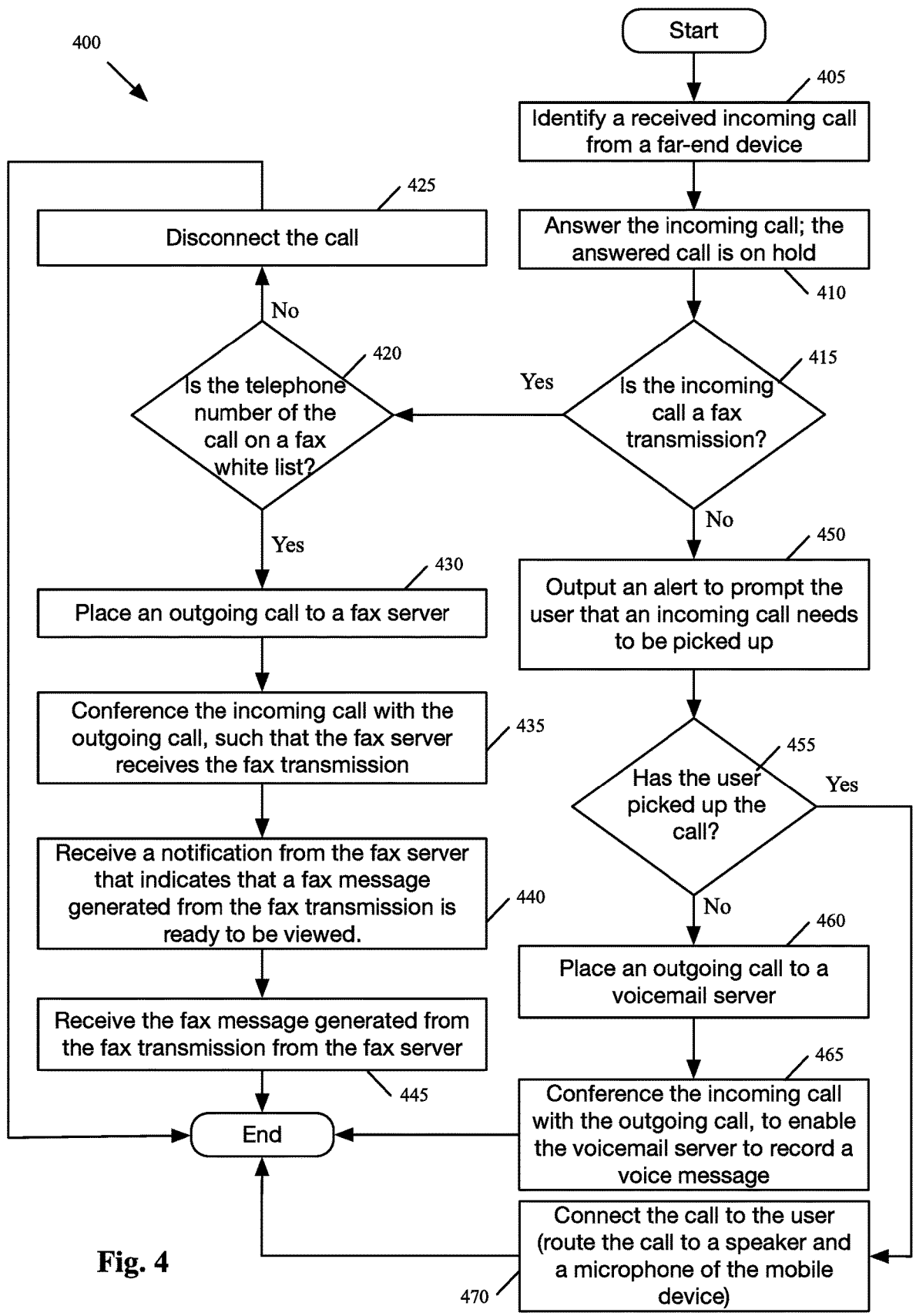
FIG. 4 is a flowchart of one embodiment of a process for automatically and transparently processing an incoming call at a mobile device, according to some embodiments.

FIG. 4 is a flowchart of one embodiment of a process 400 for automatically and transparently processing of an incoming call to a mobile device 100, to detect a fax transmission contained therein that was, sent to a telephone number of the mobile device, according to some embodiments. The operations of the flowchart may be performed by a fax software program 205 (which is stored in memory of the mobile device, and executed by a processor in a mobile device), while the fax software program 205 is in a transparent mode, as described in FIGS. 1-3. In FIG. 4, process 400 begins when the fax software program 205 identifies that an incoming call is being received, at the mobile device 100 (at block 405). For instance, the fax software program identifies that a transceiver of the mobile device is receiving a control signal (e.g., from the cell tower 145), indicating that an incoming call has been made to the mobile device.

In one embodiment, the fax software program 205 may be made aware of or may identify an incoming call by the operating system, OS, of the mobile device 100 (e.g., an ANDROID operating system). For example, the OS may automatically send broadcast messages when various system events occur (e.g., a telephony state change of an incoming call). To receive broadcast messages, the fax software program may declare a broadcast receiver with an intent to receive certain broadcast messages from the OS. In this particular case, the fax software program may declare a broadcast receiver with an intent to receive a broadcast message (sent by the OS) indicating a telephony change at the mobile device (e.g., receipt of the control signal from the cell tower 145 that indicates an incoming call). Thus, the fax software program identifies or is made aware of an incoming call, when the broadcast message indicating such a telephony change is received from the OS.

In one embodiment, the fax software program is launched or activated (e.g., brought to the foreground) when the mobile device 100 receives the incoming call. For instance, the previously described broadcast receiver may launch the fax software program when the OS broadcasts the message indicating that the incoming call is being received by the mobile device. In another embodiment, the program may remain in the background, and continuously monitor (e.g., a transceiver of) the mobile device 100 for any received incoming calls. At which point, the program may become fully active. In one embodiment, along with identifying that an incoming call is being received, the fax software program may also identify information regarding the incoming call, such as the telephone number (e.g., (333) 333-3333) of the originating device (e.g., using any caller-ID mechanism).

In one embodiment, since the fax software program is in transparent mode, the mobile device will not alert the user of the received incoming call. In other words, the fax software program may prevent an incoming call ringing alert, which normally occurs when an incoming call is received (e.g., while in manual mode), from being outputted by the mobile device. For example, the fax software program will prevent a GUI from displaying an incoming call ringing screen on a display screen of the mobile device that informs the user of the incoming call, and prompts the user to answer the incoming call. The fax software program may also prevent a triggering of a playback of a ring tone and prevent an activation of a vibration motor that would normally vibrate to indicate to the user that an incoming call is being received. In one embodiment, the fax software program prevents the alert from being outputted, upon identifying the incoming call.

The process 400 answers the incoming call without immediate user input (at block 410). Since the fax software program is in transparent mode, the program will not prompt the user to answer the call, and thus the call will be answered without receiving instructions from the user (e.g., without the user of the mobile device giving an instruction to answer the call by e.g., selecting (or actuating) a physical button or a GUI option displayed on a touchscreen display of the mobile device, or speaking a voice command, to direct the mobile device to pick up the incoming call). This is in contrast to manual mode, for example, in which a call is answered in response to immediate user input, while the mobile device prompts the user to answer the call (e.g., by outputting an alert by presenting an incoming call ring screen and/or triggering playback of a ring tone). To answer the incoming call, the fax software program may instruct the OS (through an application programming interface (API) provided in the OS) to answer the call. Specifically, the fax software program may be configured to work with the API to invoke a method (e.g., "answerRingingCall") in a TelephonyManager class of the OS to instruct the OS to answer the incoming call, without receiving (immediate) user instructions. Once the OS answers the call, the fax software program may communicate through the API with the OS of the mobile device to establish a channel (through the transceiver) with the voice/data network 140 (e.g., a mobile switching center), through the cell tower 145. Once the channel is established, the mobile device will begin receiving an incoming or so-called downlink communications audio signal or call content signal or stream being transmitted by the device 110.

In one embodiment, once the fax software program instructs the mobile device to answer the call (e.g., instructing a transceiver in the mobile device to transmit a signal back to the originating device), the program may place the incoming call on hold, thereby preventing the originating device from receiving audio from the mobile device (e.g., ambient sound that has been picked up by a microphone in the mobile device). For example, normally, when a voice call is initiated, a microphone path generates an uplink communications audio signal as sound captured by a microphone of the mobile device (e.g., an internal microphone, or an external one such as a headset microphone.) The audio signal is then transmitted (e.g., over the voice/data network 130) to the other device participating in the voice call. In transparent mode, however, the fax software program 205 may instruct the mobile device (e.g., the OS) to mute the microphone (e.g., by not turning on, or turning off, the microphone path), while the incoming call is being processed. When the incoming call is answered, the mobile device 100 may receive a downlink communications signal, but not yet transmit an uplink communications signal, since the microphone path is not generating the uplink audio signal. Preventing the transmission of the uplink audio signal has advantages. For example, if the incoming call is a fax transmission, when the incoming call is conferenced with the outgoing call to the fax server, sound at the mobile device 100 will not interfere with the fax transmission, since there will be no uplink communications audio signal. In one embodiment, rather than preventing the initiation of the microphone path, the fax software program may mute the microphone in a different manner, and transmit a muted or silent uplink communications signal instead.

The process 400 determines (or analyzes) whether the downlink communications signal indicates (at decision block 415) that the answered incoming call is or contains a fax transmission (in contrast to, for example, a voice call or voice transmission). Specifically, the fax software program can determine (or detect), with previous knowledge of fax tones, whether the incoming call is a fax transmission by applying digital audio signal processing upon the downlink communications signal, to find out whether a fax tone is present in the incoming call. An example is a 1100 Hz calling tone from the device 110. In one embodiment, the fax software program may analyze (e.g., parse) metadata accompanying the downlink signal, to determine whether the incoming call includes a fax transmission. In one embodiment, the fax software program may perform a spectral and time domain analysis of an audio-band control signal contained within the downlink signal to make the determination.

Upon detecting that the answered incoming call is a fax transmission, the process 400 determines whether an originating telephone number (e.g., (333) 333-3333) associated with the originating device is on a fax white list, which is stored in memory of the mobile device 100 (at decision block 420). Specifically, the telephone number of the originating device 110 is compared to the telephone numbers stored in the fax list. The fax list includes (a set of) telephone numbers of devices (e.g., sending parties) from which fax transmissions should be sent to the fax server. This ensures that the program screens incoming calls in order to prevent certain faxes (e.g., solicitations) from being sent to the fax server. In one embodiment, the program may be capable of allowing the user of the mobile device to enter additional (or remove) telephone numbers in the fax list, through a GUI of the fax software program. If the telephone number associated with the originating device does not match any of the stored telephone numbers, the fax software program hangs up (terminates or disconnects) the answered call (at block 425). For example, to disconnect the call, the fax software program 205 may transmit a message (e.g., a T.30 disconnect message (DCN) and optionally a Procedure Interrupt Disconnect (PID)) informing the originating device 110 that the incoming call is to be disconnected.

In one embodiment, in addition to or instead of the fax white list, including telephone numbers of devices from which fax transmissions should be sent, the fax list may contain telephone numbers from which fax transmissions should not be sent to the fax server (e.g., a black list). In this case, if the telephone number associated with the originating device matches with the stored, black list telephone numbers, the program may terminate (or disconnect) the incoming call (at block 425). Note, in one embodiment, that this black list operation (or the white list operation) described in block 420 could take place before answering the call (and thus in some cases obviating answering of the call).

Upon the telephone number associated with the originating device matching a particular number in the fax list (or in the case of the fax list being a black list, the telephone number not matching a particular number in the list), the process 400 proceeds to place (at block 430) an outgoing call to the fax server 120 (e.g., using a multi-call feature in the mobile device 100). Thus, the program places the outgoing call to the fax server to send the received downlink communications signal to the fax server. To make the call, the program may have previously stored a telephone number of the fax server 120 (e.g., when the program was downloaded/installed), which it accesses from local memory of the mobile device 100, when placing an outgoing call to the fax server 120. This telephone number may be a shared number in that it would be used by fax software programs running in the mobile devices of a number of subscribers to the messaging service (for calling the fax server 120). Once the fax server answers, the process 400 conferences, or merges, the incoming call with the outgoing call to the fax server 120 such that the fax server 120 also receives the on-going fax transmission (at block 435). For example, in one embodiment, the fax software program is an intermediary that establishes a three-way call between the originating device 110, the mobile device 100, and the fax server 120 so that the fax server 120 can receive the fax transmission originated by the device 110. Thus, acting as the intermediary, the fax software program establishes a conference call between the device 110 and the fax server 120, in order for the fax server to receive the fax transmission, without user input at the mobile device 100. In one embodiment, while the mobile device 100 conferences the call between the originating device 110 and the fax server 120, the mobile device may continue to have its microphone turned off (or muted) in order to ensure that sound (e.g., noise) at the mobile device 100 is not transmitted along with the fax transmission to the fax server.

In an embodiment where the voice/data network employs a Long Term Evolution (LTE) wireless telecom protocol, the mobile device 100 may place the outgoing call, for example, by transmitting a non-access stratum (NAS) service request to the core network (e.g., via a radio access network). As mentioned above, in one embodiment, the fax software program may have previously stored a telephone number of the fax server 120 (e.g., when the fax software program was downloaded/installed), which it accesses from local memory in the mobile device 100, when placing an outgoing call to the fax server 120. In another embodiment, the fax software program may have previously stored multiple telephone numbers that can be used to call a fax server 120 operated by a fax messaging service, and the mobile device 100 may select one of these telephone numbers to place an outgoing call to the fax server 120. In one embodiment, the fax software program selects the telephone number based on the current location of the mobile device 100. For example, the fax software program may select a telephone number that is local to the current location of the mobile device 100 so as to avoid incurring long distance charges. In yet another embodiment, the fax software program may obtain the telephone number of the fax server 120 by accessing a server that stores the telephone number of the fax server 120 (e.g., over the Internet).

In one embodiment, when the fax software program determines that the fax server 120 has finished receiving the fax transmission from the originating device 110, the fax software program may cause the mobile device 100 to end the conference call. In one embodiment, the fax software program may determine that the fax transmission has finished, by analyzing the downlink communications signal to determine whether the fax tone is still present, if not it may indicate that the fax server 120 successfully received the fax transmission. In another embodiment, the fax software program may determine that the fax transmission has finished, once it detects a calling party control (CPC) signal from the originating device that indicates that the originating device has hung up. In one embodiment, the fax server 120 may terminate the ongoing call, when the fax server 120 has received the fax transmission. At which point, in one embodiment, the fax software program may then terminate the original incoming call with the originating device 110.

The process 400 receives a notification from the fax server 120 that indicates a fax message generated from the fax transmission is ready (and available) to be viewed (at block 440). The mobile device 100 may use the received notification to alert the user of the mobile device (e.g., through a push notification from the mobile fax app itself that generates a pop-up on the display screen of the mobile device and/or a sound effect) that a fax message is available for viewing. The notification may include a link, in which the user of the mobile device 100 may select (e.g., through a tap gesture on the pop-up on the display screen of the mobile device), in order to download the fax message. As will be described later, if the user has yet to become a subscriber (e.g., has not yet created an account with the fax messaging service), the user may be prompted to create an account, once the link is selected. While, in another embodiment, the fax message may be attached to the notification. In one embodiment, since the mobile device 100 is in a transparent mode, this alert, as will be later described, is the first moment at which the user of the mobile device 100 is informed of the fax transmission. In other words, up to this point there has been no (immediate) user input with the fax software program. The process 400 receives the fax message generated from the fax transmission from the fax server 120, for display on the display screen of the mobile device 100 (at block 445). In one embodiment, the fax server sends the fax message, once it has confirmed the user is allowed to retrieve the fax message (e.g., confirmed the user is a subscriber).

Returning to block 415, if the process 400 determines that the incoming call is a voice call, rather than a fax transmission, the process 400 outputs an incoming call ringing alert to prompt the user of the mobile device that an incoming call needs to be picked up (at block 450). This determination may be based on the fact that no fax tones are present in the downlink communications signal, the metadata included in the signal does not indicate that it includes a fax transmission, or that the caller ID indicates that the telephone number associated with the originating device is not a fax number (e.g., the telephone number being a home telephone number in a contacts list stored in memory of the mobile device). In one embodiment, this determination may be based on voice recognition. For example, the fax software program 205 may identify a person speaking at the originating device by comparing speech patterns/signatures in the downlink communications signal with pre-stored speech patterns/signatures. Since up to this point, the user of the mobile device 100 has been made unaware of the incoming call (e.g., because the fax software program may perform the process 400, while in transparent mode), the fax software program may alert the user in a similar fashion to that of an unanswered incoming call. For instance, the fax software program may output an incoming call ringing alert that mimics an incoming call ringing alert that is normally used to inform the user of an identified unanswered incoming call. The outputted ringing alert may be presented through a GUI of the fax software program of the mobile device that is similar to a "normal" incoming call ringing screen (e.g., one in which a telephony application installed by a manufacturer of the mobile device 100 presents to the user to answer an incoming call) that contains (or provides) any information the user normally receives in a ringing alert (e.g., the caller ID information), and buttons or options (e.g., physical buttons on the mobile device 100 or virtual buttons displayed on a touchscreen display of the mobile device 100) for picking up and conferencing the incoming call with a voicemail service. In addition to prompting the user via the GUI, the fax software program may prompt also by triggering the playback of a ring tone, and/or activate a vibrating motor to cause the mobile device to vibrate.

In one embodiment, the mobile device may transmit a ringing tone to the originating device that has been placed on hold. For example, when the originating device places a call to the mobile device, the originating device will receive (e.g., from the PSTN 130) a ringing tone that is played back (e.g., through a speaker in the originating device), while the mobile device is being alerted of the incoming call. Once the mobile device answers the incoming call and the ringing tone ceases, the mobile device may place the originating device on hold (e.g., by turning off a microphone path at the mobile device), while it analyzes the incoming call to determine whether it includes (or is) a fax transmission. Once, however, the fax software program determines that the incoming call is a voice call, the mobile device may transmit an uplink communications signal of a ringing tone, which may be similar to the ringing tone received by the originating device prior to the mobile device answering the call. Specifically, the fax software program may instruct the transceiver of the mobile device 100 to transmit an audio signal mimicking the ringing tone to the originating device. The fax software program may continue to transmit the audio signal, until the user of the mobile device picks up the call, or until the call is conferenced with a voicemail service, as described below. This gives the impression to the sending party of the originating device 110 that the call has yet to be answered, while in reality, the mobile device 100 has already answered the call and received the downlink signal for analysis. In one embodiment, the fax software program may transmit a different ringing tone, in order to inform the sending party of the processes being performed by the fax software program. In another embodiment, rather than sending a muted uplink signal to the originating device when the call is answered (e.g., at block 410), the fax software program may immediately transmit the ringing tone. If the call is determined to be a fax transmission, then the fax software program may cease transmitting the ringing tone.

The process 400 determines whether the user has picked up the call (at decision block 455). If the user picks up the answered incoming call (e.g., actuates a physical or virtual button to pick up the call, or through voice command), then the mobile device will connect the call to the user e.g., by routing the call to a speaker and a microphone of the mobile device (at block 470). For example, once the user picks up the call, the mobile device is taken off of hold, and a speaker coupled to the mobile device converts the downlink communications signal into sound; and a microphone coupled to the mobile device converts sound captured at the mobile device to an uplink communications signal, which is then transmitted by (e.g., the transceiver of) the mobile device (through the voice/data network 140) to the originating device 110. In one embodiment, the speaker and microphone may be in the mobile device; while in another embodiment either may be coupled to the mobile device by wireless means (e.g., through a BLUETOOTH LINK). In one embodiment, once the user picks up the answered incoming call, the mobile device may cease transmitting the ringing tone to the originating device.

If, however, the user does not pick up the call, the process 400 proceeds to place an outgoing call to a voicemail server (e.g., as being part of the cloud 150 in FIG. 1, although not shown) that is operated by a cloud-based voicemail service (at block 460), which is capable of recording voice messages. Similar to placing a call to the fax server when a fax transmission is received (e.g., at block 430), the program may place the outgoing call (using the multi-call feature in the mobile device 100) to the voicemail server to send the received downlink communications signal to the voicemail server. To make the call, the program may have previously stored a telephone number of the voicemail server (e.g., inputted by the user of the mobile device after the program was downloaded/installed, or stored within the fax software program when previously downloaded). In one embodiment, the fax software program may wait a predetermined amount of time (e.g., ten seconds) to receive instructions from the user to pickup the call (e.g., through selection of a button or GUI option). If no instruction is received from the user, the application will automatically place the call to the voicemail server. Once the voicemail server answers, the process 400 conferences, or merges, the incoming call with the outgoing call to the voicemail server to enable the voicemail server to record a voice message using the downlink communications signal (at block 465), and store the voice message remotely at the voicemail server. Similar to the conference call with the fax server, the fax software program 205 may instruct the mobile device to mute the microphone, while the conference call is in process. In one embodiment, the voicemail server may be accessible over the Internet. Once the fax software program determines that the voicemail server has finished recording the voice message from the originating device (e.g., by detecting an absence of audible sound for a predetermined amount of time, or detecting a CPC signal indicating the originating device and/or voicemail server has disconnected the call), the fax software program may cause the mobile device to end the conference call. In one embodiment, the mobile device 100 may receive a notification (similar to block 440) from the voicemail server that indicates a voice message is ready to be listened to (or downloaded) by the user of the mobile device 100.

In one embodiment, a separate voicemail application (or process) being executed on the mobile device may perform the voicemail service. For example, instead of the fax software program performing steps 460 and 465, the fax software program may call upon the separate voicemail application to place the call and conference the incoming call with the voicemail server. In another embodiment, the voicemail application (or the fax software program) may record the voice message at the mobile device (rather than conferencing with a voicemail server), and store the voice message in memory of the mobile device, for the user of the mobile device 100 to listen to at a later time. In one embodiment, if the voicemail service is unavailable, the mobile device may simply disconnect the call.

Some embodiments perform variations of the process 400. For example, the specific operations of the process 400 may not be performed in the exact order shown and described. The specific operations may not be performed in one continuous series of operations, some operations may be omitted, and different specific operations may be performed in different embodiments. For instance, in one embodiment the process 400 determines whether the telephone number of the originating device (at block 420) is on the fax list (white or black list), before answering the incoming call (at block 410). In other words, rather than connecting (or answering) the incoming call, the fax software program may make this determination, and if the number is not on the list then the program may instruct the transceiver of the mobile device to refuse to pick up the call. In another embodiment, upon detecting that the answered incoming call is a fax transmission (at decision block 415), the fax software program may immediately place (at block 430) the outgoing call to the fax server to send the received downlink communications signal to the fax server, without checking to see whether the telephone number associated with the originating device is on the fax list, as previously described in FIG. 2.

Figure 5:
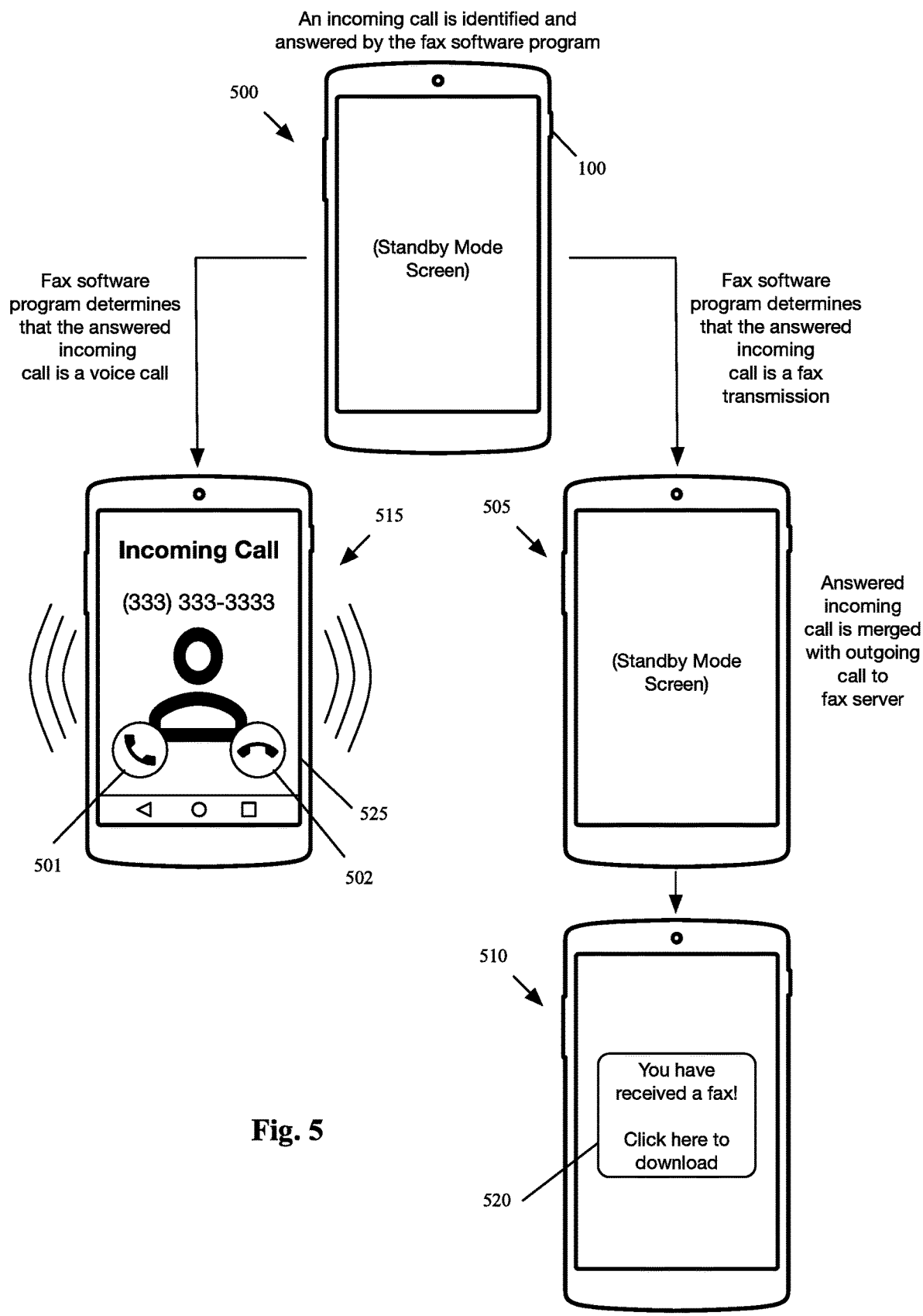
FIG. 5 shows how a mobile device progresses from a standby mode screen to an incoming call alert screen, and from the standby mode screen to a fax message received notification screen, while in a transparent mode.

FIG. 5 shows how a mobile device progresses from a standby mode screen to an incoming call alert screen, and from the standby mode screen to a fax message received notification screen, while in a transparent mode. Specifically, this figure illustrates four stages 500-515 of a display screen (e.g., touchscreen display) of the mobile device 100, as the fax software program 205 automatically processes an incoming call, while in a transparent mode. The various stages of this figure will be described by reference to FIG. 4.

Stage 500 illustrates the mobile device being in a "standby" (or sleep) mode, as an incoming call is identified and answered by the fax software program. Standby mode refers to a mode in which the mobile device 100 is powered on, which allows some applications/programs to remain active (e.g., to allow SMS messages, phone calls, emails, and alerts to be received), while the user is presented with a standby mode screen on the mobile device 100. In one embodiment, the standby mode screen is a blank screen, in which the display screen of the mobile device is not displaying any GUI. In other words, the display screen may be off. This stage shows how the mobile device remains in standby mode, presenting the user with the standby mode screen, while beginning to process the incoming call, as described, for example, in blocks 405-415 of FIG. 4. Specifically, this stage shows that the user of the mobile device is not alerted of the incoming call, while the fax software program identifies the call, answers the call, and determines whether the call includes a fax transmission. This is in contrast to manual mode, in which a telephony application (e.g., one that was installed by the manufacturer of the mobile device 100) may show a GUI of an incoming call ringing screen on the display screen of the mobile device when the incoming call is identified, to prompt the user to manually (e.g., by selecting a GUI option) to answer the call. In other words, while in transparent mode, the fax software program prevents a GUI from displaying an incoming call ringing screen on the display screen, upon the identification of the incoming call, for example. Specifically, in one embodiment, the fax software program may instruct the OS of the mobile device 100 to not inform the telephony application of incoming calls, in order to prevent it from displaying its incoming call ringing screen. For instance, similar to the fax software program, the telephony application may request the OS (e.g., through a Broadcast Receiver) to send broadcast messages of a telephony state change of an incoming call. The fax software program may intervene with this instruction by restricting these types of broadcast messages to only be broadcasted, by the OS, to the fax software program through the use of permissions. For example, the fax software program may invoke a method (e.g., "sendBroadcast"), in which the fax software program may specify permission parameters, restricting other program applications (e.g., the telephony application) from receiving broadcast messages. Thus, when the mobile device receives an incoming call, the telephony application remains unaware of the telephony state change, since the OS may be instructed to not broadcast a telephony state change message to the telephony application, thereby preventing the telephony application from displaying the incoming call ringing screen. Thus, since the mobile device is in standby mode, the user of the mobile device is made unaware of the received and answered incoming call. In one embodiment, even though the user may be interacting with the mobile device (e.g., playing a game), thereby presenting something other than the standby mode screen, the fax software program may still process the incoming call without informing the user.

Stage 505 illustrates that the mobile device remains in standby mode, after the fax software program determines that the answered incoming call is (or contains) a fax transmission. Specifically, this stage shows how the mobile device remains in standby mode, continuing to present the user with the standby mode screen, while the fax software program places an outgoing call to the fax server and merges the incoming call with the outgoing call to the fax server, in order to send the fax transmission to the fax server, as described in blocks 430 and 435. Thus, the incoming call ringing screen that would be otherwise presented to the user, is further prevented from being presented as the fax software program sends the fax transmission to the fax server. In one embodiment, if the fax software program determines that the telephone number associated with the originating device is not on the fax list (as described in decision block 420), the mobile device would terminate the call and continue to present the standby mode screen. Thus, if a fax transmission is received from a device not authorized by the user to be sent to the fax server, the fax software program will screen the call that includes the fax transmission, without alerting the user.

Stage 510 illustrates the mobile device changing the standby mode screen to a fax message received notification screen, by displaying a pop-up 520 of a (e.g., push) notification, which is received from the fax server, as described in block 440 of FIG. 4. As previously described, the displayed pop-up notification 520 may be in the form of a message (e.g., SMS) with a link that the user may select in order to download the fax message from a website, or a selectable pop-up notification, which the user may select in order to retrieve the fax message. In one embodiment, the pop-up 520 is a notification of a received e-mail, in which the user may access to either view the fax message (if it was attached to the e-mail), or follow instructions in order to download the fax message from a website.

Stage 515 illustrates the mobile device exiting standby mode, and presenting an incoming call alert screen to prompt the user to answer the call, after the fax software program determines that the answered incoming call is a voice call, rather than a fax transmission, as described in block 450 of FIG. 4. For example, upon detecting that the incoming call is a voice call, the fax software program may output an alert that mimics a ringing alert that is normally used to inform the user of an unanswered incoming call and prompt the user to pick up the call. The alert instructs the mobile device to activate its display screen and present the incoming call ringing screen, in which the alert is presented through a GUI 525 that may be similar to a GUI that a telephony application (e.g., one that was installed by the manufacturer of the mobile device 100) normally displays to inform a user of an unanswered incoming call (e.g., such as one that may be displayed while the mobile device is in manual mode). This would provide the user with consistency, rather than having to see two separate GUIs, based on whether the fax software program is active. The GUI 525 provides the user with a first selectable option 501 that upon selection by the user, instructs the fax software program to pick up the answered incoming call, and a second selectable option 502 that upon selection by the user, instructs the fax software program to transfer the answered incoming call to a voicemail service. In addition, GUI 525 also includes information regarding the incoming call, such as the telephone number associated with the originating device (e.g., through the use of a caller ID mechanism). In one embodiment, the alert may include other aspects of the ringing alert. For instance, the fax software program, through use of the alert, may prompt by triggering playback, through a speaker, a ring tone that provides the user with an indication that a call needs to be picked up by the user. Also, the fax software program may prompt by activating a vibration motor to cause the mobile device to vibrate. It should be understood that the mobile device may alert the user of the incoming voice call through any conventional mechanism.

Figure 6:
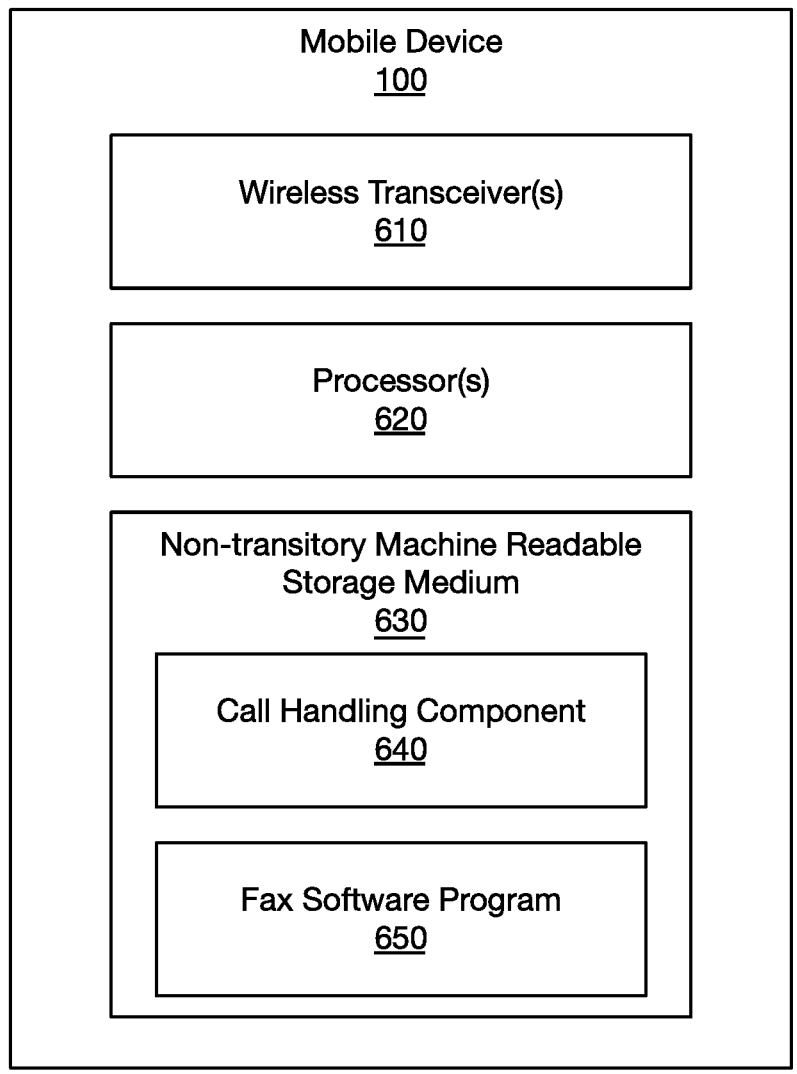
FIG. 6 is a block diagram illustrating a mobile device, according to some embodiments.

FIG. 6 is a block diagram illustrating a mobile device, according to some embodiments. The mobile device 100 includes a wireless transceiver 610, a processor 620, and a non-transitory machine-readable storage medium 630. The non-transitory machine-readable storage medium 630 has stored therein a manual call handling component 640 and a fax software program 650. Examples of non-transitory machine readable storage mediums include read-only memory, random-access memory, CD-ROMs, DVDs, magnetic tape, optical data storage devices, flash memory devices, and phase change memory.

The wireless transceiver 610 allows the mobile device 100 to wirelessly communicate with other devices such as device 110 and/or a fax server 120 over a communications network (e.g., over voice/data network 140 via cell tower 145 or via router 155). In one embodiment, the wireless transceiver 610 is a radio transceiver that can exchange radio signals with a cell tower 145. While, in another embodiment, the wireless transceiver can exchange radio signals with the router 155, in order to transmit and receive data across the communications network.

The processor 620 may include one or more data processing circuits, generically referred to here as "a processor" which may include a microprocessor, a central processing unit, an applications processor, or a system on a chip. The processor 620 may execute the manual call handling component 640 and the fax software program 650 to perform some or all of the mobile device operations and methods that are described above for one or more of the embodiments related to the mobile device 100. In one embodiment, the amount of operations and methods that either of the manual call handling component 640 and the fax software program 650 perform, are based on what mode the mobile device 100 is in. For example, while in manual mode, the processor 620 may execute the manual call handling component 640 to receive and answer incoming calls, to place outgoing calls (e.g., to a fax server 120), to conference an incoming call with an outgoing call, and to terminate (or refuse) an incoming call. The processor 420 may execute the fax software program 450 to identify that an incoming call is a fax transmission, to cause or signal the manual call handling component to place an outgoing call to a fax server 120, to cause or signal the manual call handling component to conference an ongoing incoming call with an outgoing call to a fax server 120, and to receive a fax message, generated from the fax transmission, from the fax server. While in transparent mode, on the other hand, the processor may execute the fax software program 650 to perform (at least some of) the operations and methods of the manual call handling component 640, described above. For instance, the fax software program 650 may receive and answer incoming calls, place outgoing calls, and to terminate an incoming call. In addition, while in transparent mode, the processor 620 may execute the fax software program 650 to perform additional tasks, such as to determine whether a telephone number associated with the originating device is on a fax list, to alert the user of the answered incoming call being a voice call, and to connect the call with the user, when the user picks up.

In one embodiment, the fax software program may be configured to work with the API provided in the OS (e.g., ANDROID OS). For example, the fax software program may make a call to the OS software stake to identify whether an incoming call is being received at the mobile device, to (e.g., automatically and without immediate user intervention) answer the incoming call being received at the mobile device, and restrict certain permissions of other applications (e.g., the telephony application executing on the mobile device). It should be understood that the fax software program may instruct (through the API) the OS to perform any of the other previously described operations. For instance, any of the operations described in FIGS. 1-5.

In one embodiment, the mobile device 100 may also include other components. For example, the mobile device 100 may include a vibration motor, that when activated (e.g., when the fax software program is alerting the user to pick up the call) vibrates the mobile device. The device may also include a microphone to capture sound that is to be converted into an uplink communication signal that is to be sent by the transceiver 610 of the mobile device, to the device 110, while both devices are engaged in a voice call. The device may also include a speaker to output sound (e.g., a ring tone and the downlink communications signal). Also, as previously described, the device 100 may include a (e.g., touch sensitive) display screen for displaying a GUI of the fax software program.

Figure 7:
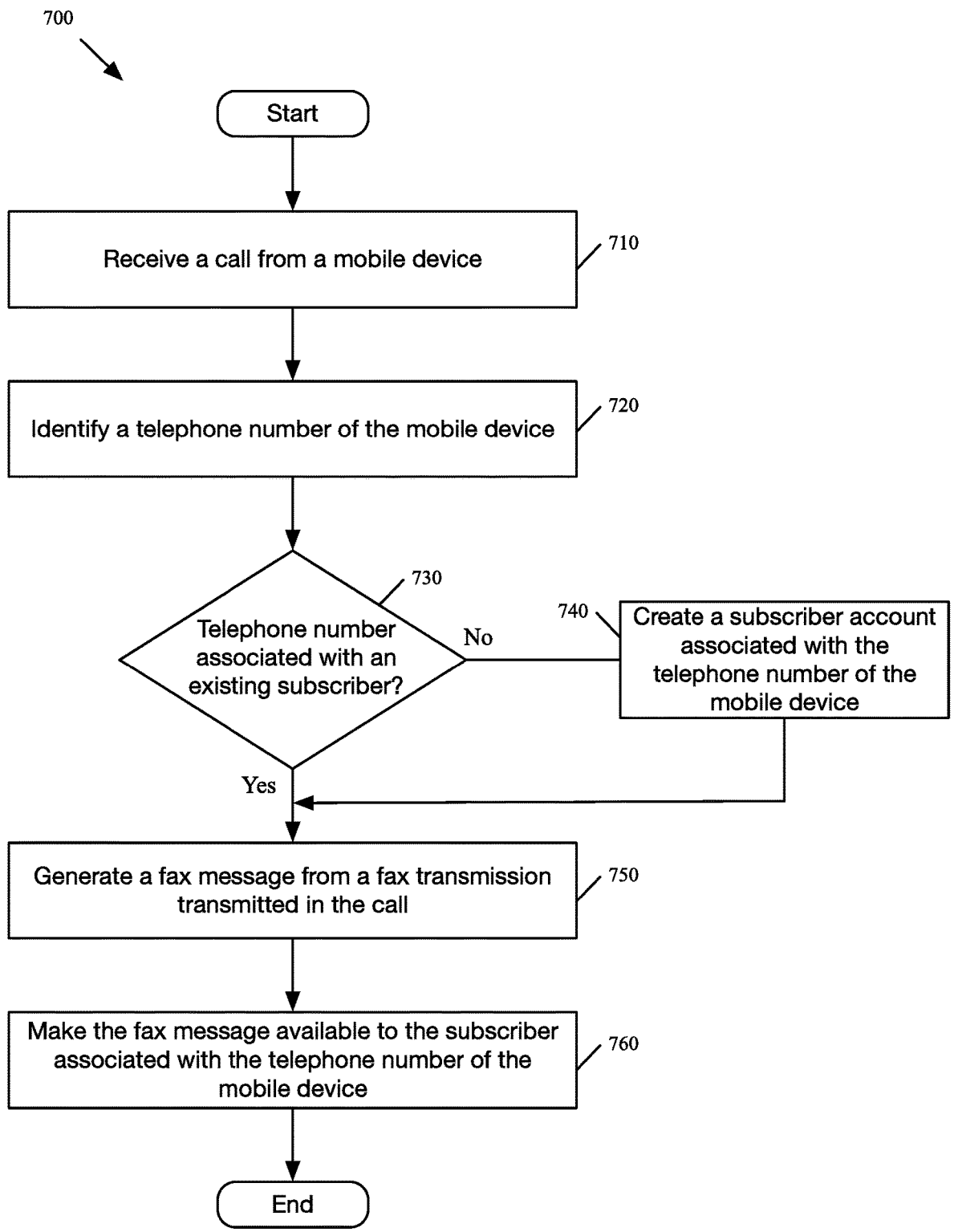
FIG. 7 shows a flow diagram illustrating operations performed by a fax server.

FIG. 7 is a flow diagram illustrating a process performed by a fax server to process a fax transmission, according to some embodiments. Fax server 120 may perform the operations of the flow diagram in this figure. In one embodiment, the process is initiated when the fax server 120 receives a call from a mobile device (block 710). The call may have been initiated by the mobile device 100 in response to the mobile device 100 receiving a fax transmission from a device 110 (e.g., as in block 430 in FIG. 4). The fax server 120 identifies a telephone number of the mobile device (block 720). In one embodiment, the telephone number of the mobile device is identified using caller-ID techniques. The fax server 120 determines whether the telephone number of the mobile device is associated with an existing subscriber of the fax messaging service (decision block 730). In one embodiment, the fax server 120 determines whether the telephone number of the mobile device is associated with an existing subscriber of the fax messaging service by matching the telephone number of the mobile device 100 against subscriber records stored in a database. If the telephone number of the mobile device 100 is not associated with an existing subscriber, then the fax server 120 creates a subscriber account associated with the telephone number of the mobile device 100 (block 740). In one embodiment, the fax server 120 may obtain additional information about the user of the mobile device 100 (e.g., e-mail address, notification preferences) and associate this information with the subscriber account. This additional information may be obtained, for example, through the fax software program running on the mobile device 100, a website, or other means.

If the telephone number of the mobile device 100 is already associated with an existing subscriber or a subscriber account associated with the telephone number of the mobile device 100 has been created (e.g., as in block 740), then the fax server 120 generates a fax message from a fax transmission in the call (block 750) and makes the fax message available to the subscriber associated with the telephone number of the mobile device 100 (block 760). The fax server 120 can make the fax message available to the subscriber associated with the telephone number of the mobile device 100 through various means. For example, in one embodiment, the fax server may send a text message to the known telephone number of the mobile device 100 that indicates that the fax message is ready for viewing and that also provides information on how to access the fax message. In another embodiment, the fax server 120 may send the fax message as an attachment in an e-mail to an e-mail address associated with the subscriber. In another embodiment, the fax server 120 may store the fax message on a server that is accessible by the subscriber (e.g., through a portal website). In yet another embodiment, the fax server 120 may send the fax message directly to the mobile device 100 such that the subscriber can view the fax message directly from the fax software program installed on the mobile device 100. In another embodiment, the fax server may transmit a notification to the mobile device, which then uses the received notification to alert the user of the mobile device (e.g., through a push notification from the fax software program itself that generates a pop-up on the display screen of the mobile device and/or a sound effect) that a fax message is available for viewing. Thus, the process allows a fax server 120 to process a fax transmission received in a call from a mobile device 100.

Some embodiments perform variations of the process 400. For example, the specific operations of the process 400 may not be performed in the exact order shown and described. The specific operations may not be performed in one continuous series of operations, some operations may be omitted, and different specific operations may be performed in different embodiments.

Figure 8:
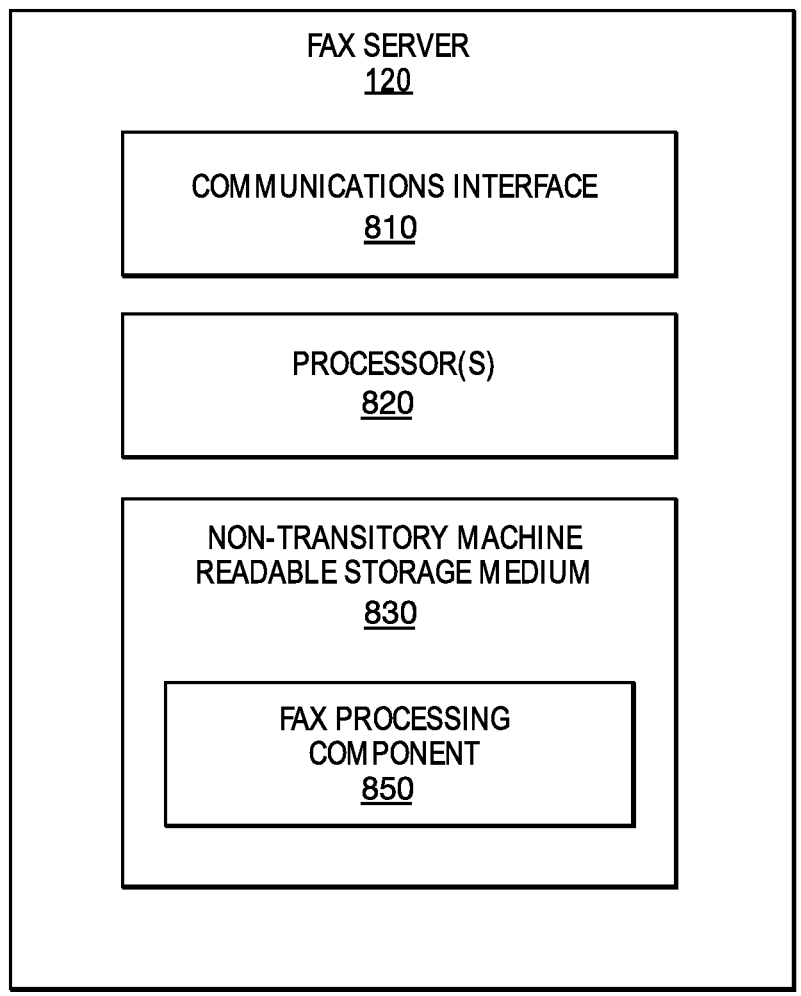
FIG. 8 is a block diagram illustrating a fax server, according to some embodiments.

FIG. 8 is a block diagram illustrating a fax server, according to some embodiments. The fax server 120 includes a communications interface 810, a processor 820, and a non-transitory machine-readable storage medium 830. The non-transitory machine-readable storage medium 830 has stored therein a fax processing component 850. Examples of non-transitory machine readable storage mediums include read-only memory, random-access memory, CD-ROMs, DVDs, magnetic tape, optical data storage devices, flash memory devices, and phase change memory.

The communications interface 810 provides an interface for the fax server 120 to receive a call from a mobile device 100 over a voice communications network (e.g., a PSTN 130 or voice/data network 140). In one embodiment, the communications interface 810 also provides an interface for the fax server 120 to exchange data with the mobile device 100 over a data communications network (e.g., the Internet).

The processor 820 may include one or more data processing circuits, generically referred to here as "a processor." The processor 820 may execute the fax processing component 850 to perform some or all of the fax server operations and methods that are described above, for one or more of the embodiments related to the fax server 120. For example, the processor 820 may execute the fax processing component 850 to receive a call from a mobile device, identify a telephone number of the mobile device, determine whether the telephone number of the mobile device is associated with an existing subscriber of the fax messaging service, create a subscriber account associated with the telephone number of the mobile device, generate a fax message from the fax transmission transmitted by the call, and make the fax message available to the subscriber associated with the telephone number of the mobile device. Accordingly, the fax server 120 can carry out at least some of the functionality described herein to process a fax transmission received from a call from a mobile device 100.

An embodiment may be an article of manufacture in which a non-transitory machine-readable storage medium has stored thereon instructions which program one or more data processing components (generically referred to here as "a processor") to perform the operations described above. For example, in one embodiment, the above-described processes (e.g., process 400 of FIG. 4, and process 700 of FIG. 7) may be performed by the processor that is executing instructions stored in the non-transitory machine-readable storage medium. The non-transitory machine readable storage medium may be a part of the mobile device 100 or the fax server 120. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A method performed by a programmed processor executing a fax software program in a mobile device, the method comprising:

identifying an incoming call at the mobile device from an originating device;
in response to identifying the incoming call, preventing a display screen of the mobile device from outputting an incoming call ringing alert;
answering, without immediate user input, the incoming call while preventing the display screen of the mobile device from outputting the incoming call ringing alert;
placing the incoming call on hold; and
while the incoming call is on hold:
  determining that the incoming call is a voice call;
  in response to determining that the incoming call is a voice call, transmitting an uplink communication signal that comprises a ringing tone to the originating device for playback through a speaker of the originating device; and
  outputting an incoming call ringing alert at the mobile device.

2. The method of claim 1 further comprising entering a transparent mode of operation based on a user-configurable setting, wherein the transparent mode of operation prevents the incoming call ringing alert from being outputted until the incoming call is determined to be the voice call.

3. The method of claim 1, wherein placing the answered incoming call on hold comprises muting a microphone of the mobile device, while determining that the incoming call is the voice call and while the incoming call ringing alert is outputted.

4. The method of claim 3, wherein the incoming call comprises a downlink communications signal, wherein the method further comprises
in response to outputting the incoming call ringing alert, determining whether the voice call is picked up by a user of the mobile device; and
in response to a determination that the voice call is picked up by the user, 1) unmuting the microphone and 2) routing the downlink communications signal to a speaker of the mobile device.

5. The method of claim 1, wherein the incoming call comprises a downlink communications signal, and the method further comprises
in response to outputting the incoming call ringing alert, determining whether the voice call is picked up by a user of the mobile device; and
in response to a determination that the voice call is not picked up by the user, 1) placing an outgoing call to a voicemail server and 2) conferencing the answered incoming call with the outgoing call to the voicemail server to enable the voicemail server to record a voice message using the downlink communications signal.

6. The method of claim 1, wherein outputting the incoming call ringing alert comprises
activating the display screen to display a graphical user interface (GUI) that notifies a user of the mobile device of the incoming call; and
playback, through a speaker, a ring tone that provides the user with an indication that the answered voice call is to be picked up by the user or activating a vibration motor to cause the mobile device to vibrate.

7. The method of claim 1, wherein the mobile device is a cellular phone or a smartphone.

8. A mobile device comprising
a display screen;
a processor; and
memory having stored therein instructions of a fax software program that when executed by the processor cause the mobile device to in response to an incoming call from an originating device being identified, prevent the display screen of the mobile device from outputting an incoming ringing alert;

answer, without immediate user input, the incoming call;

place the incoming call on hold; and while the incoming call is on hold:

determine that the incoming call is a voice call; and in response to determining that the incoming call is a voice call, i) transmit an uplink communication signal of a ringing tone to the originating device for playback through a speaker of the originating device, and ii) output an incoming call ringing alert.

9. The mobile device of claim 8, wherein the memory has further instructions for the processor to enter a transparent mode of operation based on a user configurable setting, wherein the transparent mode of operation prevents the incoming call ringing alert from being outputted until the incoming call is determined to be the voice call.

10. The mobile device of claim 8, wherein the instructions to place the answered incoming call on hold comprises instructions to mute a microphone of the mobile device, while determining that the incoming call is the voice call and while the alert is outputted.

11. The mobile device of claim 10, wherein the incoming call comprises a downlink communications signal, wherein the memory has further instructions to in response to outputting the incoming call ringing alert, determine whether the voice call is picked up by a user of the mobile device; and in response to a determination that the voice call is picked up by the user, 1) unmute the microphone and 2) route the downlink communications signal to a speaker of the mobile device.

12. The mobile device of claim 8, wherein the incoming call comprises a downlink communications signal and the memory has further instructions that configure the processor to, in response to a determination that the voice call is not picked up by the user, 1) place an outgoing call to a voicemail server and 2) conference the answered incoming call with the outgoing call to the voicemail server to enable the voicemail server to record a voice message using the downlink communications signal.

13. The mobile device of claim 8 further comprising a speaker and a vibration motor, wherein the instructions to output the incoming call ringing alert causes the mobile device to display, on the display screen, a graphical user interface (GUI) that notifies a user of the mobile device of the incoming call; and playback, through the speaker, a ring tone that provides the user with an indication that the answered voice call is to be picked up by the user or activate the vibration motor to cause the mobile device to vibrate.

14. The mobile device of claim 8 is a cellular phone or a smartphone.

15. A non-transitory machine-readable medium having stored therein instructions of a fax software program to be executed by a mobile device, the instructions when executed by the mobile device cause the mobile device to identify an incoming call at the mobile device;

in response to identifying the incoming call, prevent a display screen of the mobile device from outputting an incoming call ringing alert;

answering, without immediate user input, the incoming call;

in response to answering the incoming call, determine that the incoming call is a voice call; and in response to determining that the incoming call is a voice call, output an incoming call ringing alert; and in response to determining that the incoming call is not picked up by a user of the mobile device while outputting the incoming call ringing alert, 1) place an outgoing call to a voicemail server and 2) conference the incoming call with the outgoing call to the voicemail server to enable the voicemail server to record a voice message.

16. The non-transitory machine-readable medium of claim 15, wherein the medium stores additional instructions that when executed causes the mobile device to enter a transparent mode of operation based on a user-configurable setting, wherein the transparent mode of operation prevents the incoming call ringing alert from being outputted, until the incoming call is determined to be the voice call.

17. The non-transitory machine-readable medium of claim 15, wherein the medium stores additional instructions that when executed causes the mobile device to place the incoming call on hold after having answered the incoming call, by muting a microphone of the mobile device, wherein the incoming call remains on hold while determining that the incoming call is a voice call and while the incoming call alert is outputted.

18. The non-transitory machine-readable medium of claim 17, wherein the incoming call comprises a downlink communications signal, and the medium stores additional instruction that when executed causes the mobile device to in response to outputting the incoming call ringing alert, determine whether the incoming call is picked up by a user of the mobile device; and in response to a determination that the incoming call is picked up by the user, 1) unmute the microphone and 2) route the downlink communications signal to a speaker of the mobile device.

19. The non-transitory machine-readable medium of claim 15, wherein the incoming call comprises a downlink communications signal and the medium stores additional instructions that when executed causes the mobile device to receive, after disconnecting the outgoing call with the voicemail server, a notification from the voicemail server that indicates a voice message is ready to be listened to by the user of the mobile device.

20. The non-transitory machine-readable medium of claim 15, wherein outputting the incoming call ringing alert comprises activating the display screen to display a graphical user interface (GUI) that notifies a user of the mobile device of the incoming call; and playback, through a speaker, a ring tone or activate a vibration motor to cause the mobile device to vibrate.

* * * * *